United States Patent [19]

Altoz et al.

[11] 4,273,183
[45] Jun. 16, 1981

[54] MECHANICAL HEAT TRANSFER DEVICE

[75] Inventors: Frank E. Altoz, Catonsville; William H. Winn, Linthicum, both of Md.

[73] Assignee: The United States of America as represented by the Secretary of the Air Force, Washington, D.C.

[21] Appl. No.: 62,592

[22] Filed: Jul. 31, 1979

[51] Int. Cl.³ .............................................. F28F 27/00
[52] U.S. Cl. ........................................ 165/32; 165/44; 165/185
[58] Field of Search ............................ 165/32, 185, 44

[56] References Cited

U.S. PATENT DOCUMENTS

| B 529,194 | 3/1976 | Kroebig et al. | 165/32 |
| 3,372,737 | 3/1968 | Schnell | 165/32 |
| 3,449,172 | 6/1969 | Dingwall | 165/185 X |
| 3,478,819 | 12/1980 | Reinke . | |
| 3,478,819 | 11/1969 | Reinke | 165/32 |

Primary Examiner—Albert W. Davis
Attorney, Agent, or Firm—Donald J. Singer; Arsen Tashjian

[57] ABSTRACT

A unidirectional heat transfer device for use between an electronic assembly on an aircraft and the skin and/or pod on the aircraft. The device includes a thermal decoupler mechanism which operates to disengage a retractable interface heat transfer surface when the skin on the aircraft reaches a predetermined elevated temperature caused by the high speed of the aircraft. In the decoupled mode, the heat from the electronic equipment passes to a phase change material heat absorber to provide a limited capability cooling function during extended high speed aircraft operation.

2 Claims, 3 Drawing Figures

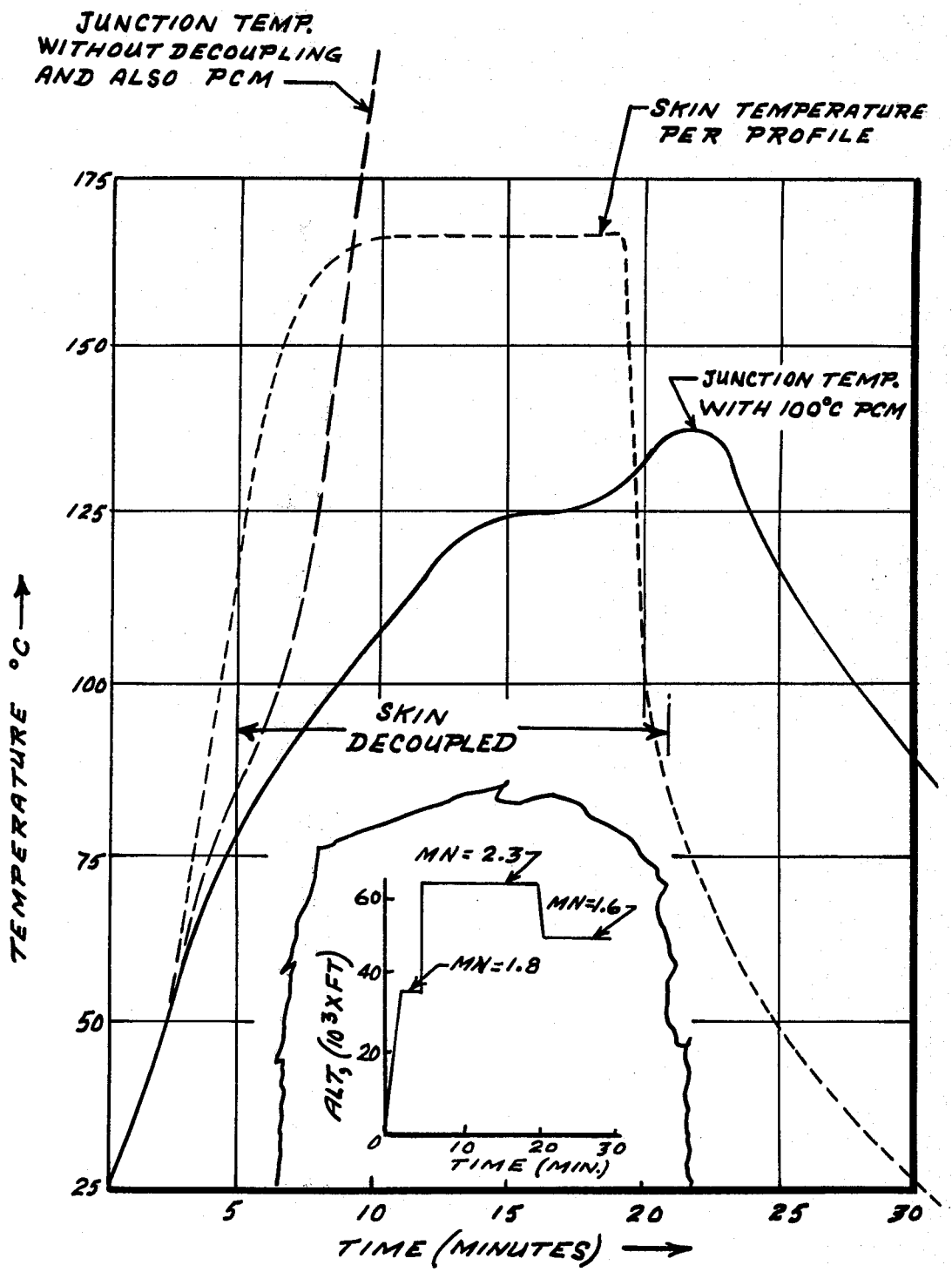

MECHANICAL HEAT TRANSFER DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to a mechanical heat transfer device and, more particularly, the invention is concerned with providing a unidirectional heat transfer device for an aircraft electronic assembly wherein a phase change heat absorbtion exchanger operates to transfer heat from the electronic assembly across the interface coupling surfaces to the aircraft skin until the skin reaches a predetermined elevated temperature at which time the interface surfaces are decoupled to prevent reverse heat flow back from the skin to the electronics.

There have been an increasing number of applications for cooling electronics aboard aircraft through the boundary layer skin heat transfer mode. This technique entails the establishment of a good thermal path for normal operation at moderate aircraft speeds and for decoupling this path during dash operation when skin temperatures are excessively high. As an example, at 20,000 feet, a fighter aircraft traveling at Mach number 0.9 will reach an adiabatic skin temperature of 101° F.; at Mach 2.0, the skin reaches 375° F. which is too high to be effective in electronic cooling.

The hereinafter described device provides a good thermal path from the electronics to the skin at normal aircraft speeds and at dash speeds imposes an interruption to heat conduction thus preventing heat flow from the skin to the electronics. By including a phase change heat absorption exchanger for the dash conditions, the maximum temperature of the electronics can be controlled within safe operating levels.

SUMMARY OF THE INVENTION

The present invention is concerned with providing an automatic thermal decoupling heat transfer device which interrupts the flow of heat at a predetermined temperature level in order to protect sensitive electronic components from overheating. The electronic unit under normal operating condition transfers its heat through a phase change heat exchanger, across interface coupling surfaces, through a flexible thermal conductor and onto the skin outer surface after passing across a stationary plate. At normal aircraft speeds this represents the usual mode of heat transfer. At high aircraft speeds, an actuator senses skin temperature and causes motion to a decoupling linkage which, in turn, disengages the retractable interface heat transfer surface separating it from the electronic component.

Accordingly, it is an object of the invention to provide a mechanical heat transfer device for use in an aircraft to maintain electronic equipment at controlled operating temperatures by establishing a thermal path for heat transfer to the aircraft skin at moderate aircraft speeds and for decoupling the path at dash speeds when the skin temperatures are excessively high.

Another object of the invention is to provide a unidirectional mechanical heat transfer device wherein a phase change heat absorption exchanger operates to effectively control the temperature of the electronic equipment when the skin temperature of the aircraft is too high to be effective as a cooling means.

Still another object of the invention is to provide a heat transfer device which operates at normal aircraft speeds to conduct heat from on-board electronic equipment to the aircraft skin and which disengages a retractable interface heat transfer surface in response to a decoupling force produced when the aircraft speed increases and the skin temperature rises accordingly.

A further object of the invention is to provide a heat transfer device for controlling the operating temperature of electronic equipment aboard high performance military aircraft wherein a heat transfer skin cooling means is combined with a phase change material heat absorber to provide a limited dash capability cooling function.

These and other objects, features and advantages will become more apparent after considering the following detailed description taken in conjunction with the annexed drawings and appended claims.

BRIEF DESCRIPTION OF THE DRAWINGS

FIG. 3 is a temperature versus time curve for a typical maximum total heat flight profile for the Tail Warning System showing the electronic junction and skin temperature profile.

DESCRIPTION OF A PREFERRED EMBODIMENT

Figure 1:
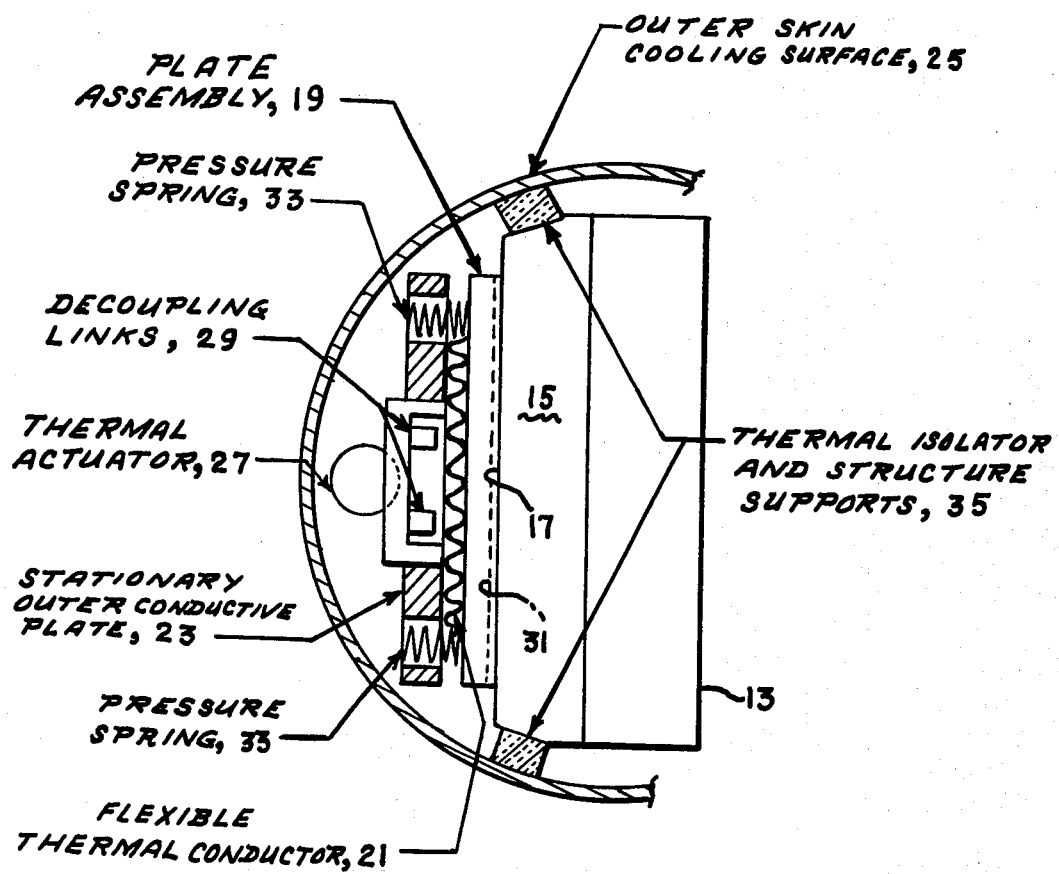
FIG. 1 is a side view in partial section of a heat transfer device concept according to the invention mounted for use in an aircraft tail warning system.

Referring now to the drawings, FIG. 1 shows the unidirectional heat transfer concept according to the invention. The electronic unit 13 to be cooled operates under normal conditions by transferring its heat through a phase change material (PCM) heat exchanger 15 and across interface coupling surfaces at 17 to a plate assembly 19. A flexible thermal conductor 21 transfer the heat from the plate assembly 19 to the stationary outer conductive plate 23 and on into the outer skin cooling surface 25. This describes the usual mode of heat transfer from the electronic unit 13 to the outer skin cooling surface 25 at normal aircraft speeds.

At high aircraft speeds, a thermal actuator 27 senses the temperature of the outer skin 25 and causes motion to a decoupling linkage 29 (shown schematically) which in turn disengages the retractable interface heat transfer surface 17 and forces it to the location 31 (shown as a dotted line). The force for this motion emanates over a narrow temperature band (less than 5° C.) and is of sufficient magnitude to overcome the normal opposing pressure at the interface surfaces 17 caused by the pressure springs 33. A thermal isolator and structural support 35 is positioned between the PCM heat exchanger 15 and the outer skin cooling surface 25.

Figure 2:
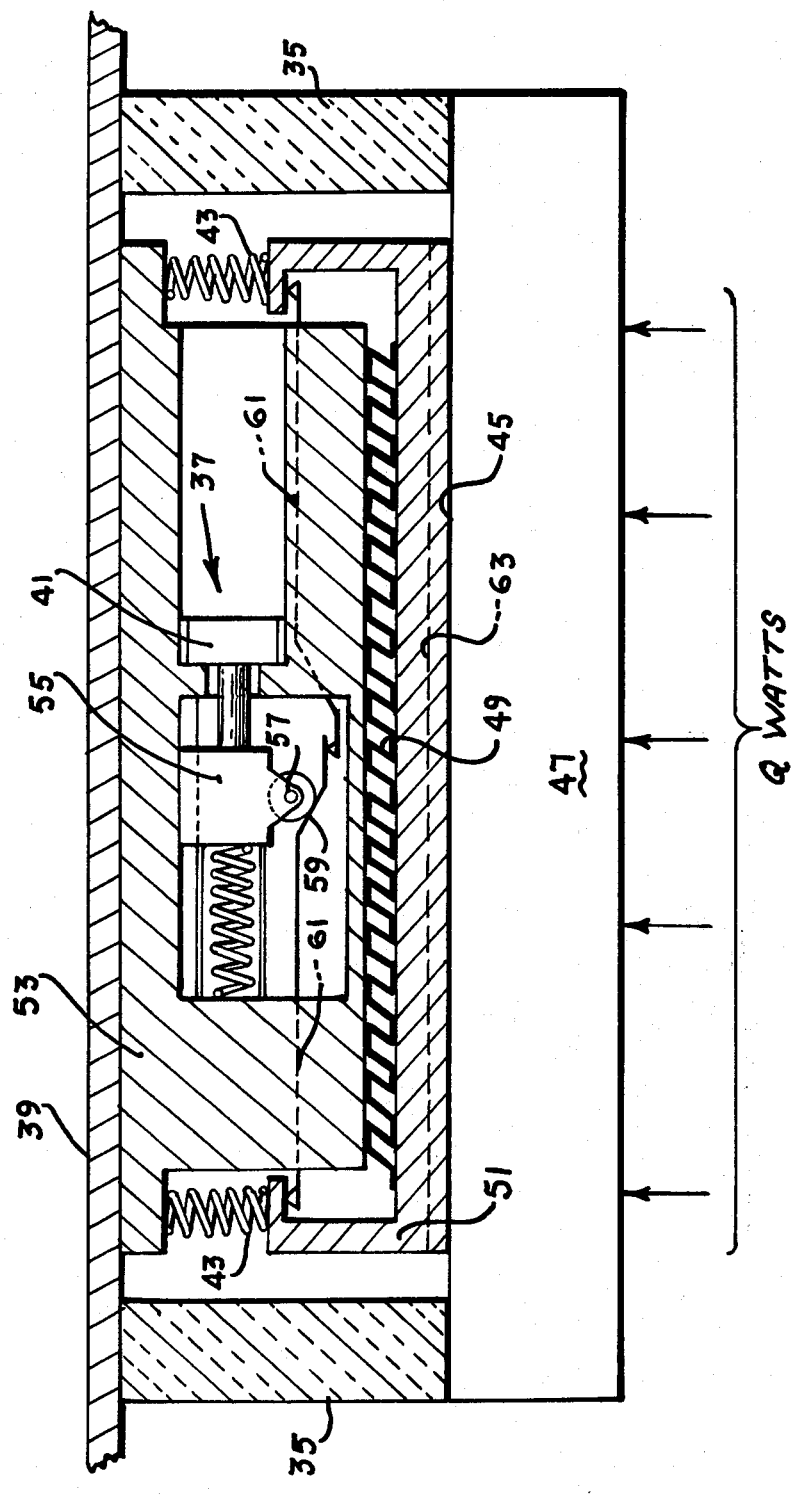
FIG. 2 is an enlarged side view of the heat transfer device partially sectioned in position against the outer skin of an aircraft showing the details in schematic of the thermal decoupler mechanism.

The design detail of the thermal decoupler mechanism suitable for installation in a military aircraft tail cap is illustrated in FIG. 2. An actuator 37 senses temperature at the outer skin 39 causing integral expansion of a phase change material which, upon melting, drives the piston 41 against the force of the coupling springs 43 and the return spring 44. In a typical application, the actuator movement is slightly under 0.25 inches and the force reaches 80 pounds. Both actuator travel and force are converted through a mechanical linkage (described below) into a separation of the two contact surfaces at the interface 45 which ordinarily serves to conduct heat to the exterior pod skin 39. The breaking of the interface 45 by as little as 0.010 inches is sufficient to alter the heat transfer and essentially provide thermal isolation from source to sink. The actuator motion is predetermined by selecting a temperature level corresponding to a safe upper limit for electronic operation. In a typical Tail Warning System (TWS), this temperature has been found to be 175° to 180° F. (80° to 83° C.).

Referring again to FIG. 2, a practical embodiment of the thermal decoupler mechanism in a TWS is illustrated. In FIG. 2, normal surface engagement under pressure is assured through coil or Belleville type springs 43 which exert pressure against the phase change material heat exchanger 47 at the interface surface 45. The heat exchanger 47 is held in position by the thermal isolator and structural support 48. Heat travels from the electronic assembly across the interface surfaces 45 and on outward to the exterior skin 39. Copper flexible elements 49 are positioned between the plate assembly 51 and the stationery outer conductive plate 53 to serve as intermediate heat transfer elements. These elements 49 fabricated of thin corrugated material are in the form of leaves or fins and deflect under application of a separation force provided by the mechanism which originates at the actuator piston 41. A linkage actuator 55 consisting of track roller bearings 57 actuates cam surface 59 and in turn causes pivoting links 61 to pivot around the pivot points 62 and exert a disengaging force on plate assembly 51 resulting in movement of its interface surface to the decoupled position represented by the dotted line 63. The slight motion of less than 0.03 inches is absorbed by the flexible copper fin elements 49 which are preformed at a large angle with respect to the direction of applied force for easy deflection.

In the decoupled position, the electronic heat, Q watts, is absorbed in the heat exchanger 47 which is sized to match a specific aircraft mission. A typical maximum total heat flight profile for the Tail Warning System is shown in FIG. 3. This electronic junction and skin temperature profile represents calculated values obtained from analysis. The decoupling and coupling occurence is also shown in FIG. 3 as a matter of interest.

Although the invention has been illustrated in the foregoing specification in terms of preferred embodiments thereof, the invention is not limited to these embodiments or to the particular configurations shown and described. It will be apparent to those skilled in the art that certain changes, modifications and substitutions can be made with respect to the shape of the elements without departing from the true spirit and scope of the appended claims. It can be seen that the invention may be used in other operations where it is desirable to provide a unidirectional heat exchanger having both heat transfer and isolating modes.

Having thus set forth the nature of our invention, what we claim as new and desire to secure by Letters Patent of the United States is:

1. A unidirectional heat transfer device for use on an aircraft to cool an electronic assembly installed therein, said heat transfer device comprising a heat exchanger in surface contact with the electronic assembly, a plate assembly having one side in surface contact with said heat exchanger, interface coupling surfaces formed between said heat exchanger and said plate assembly, a flexible thermal conductor in surface contact with the other side of said plate assembly, a stationary outer conductor plate having one side in surface contact with said flexible thermal conductor, the other side of said conductor plate being in contact with the outer skin of the aircraft, a thermal actuator positioned within said outer conductor plate for sensing and reacting to the increase in temperature of the outer skin of the aircraft, said actuator being fabricated of a phase change material, an actuator piston attached to said thermal actuator for producing linear movement in response to phase change thereof, a cam roller attached to said actuator piston for movement therewith, a pair of pivoting links positioned between said cam roller and said plate assembly, a cam surface on one of said pivoting links in contact with said cam roller to cause said pivoting links to pivot in response to movement of said cam roller, the pivoting of said pivoting links producing a decoupling movement of said plate assembly to prevent heat from the outer skin of the aircraft from flowing back to the electronic assembly, a first biasing means for holding said plate assembly against the surface of the electronic assembly, and a second biasing means for urging said actuator piston back to its first position when the temperature of the outer skin of the aircraft decreases to a predetermined lower level, thereby allowing heat to flow again from the electronic assembly to the outer skin of the aircraft.

2. The unidirectional heat exchanger defined in claim 1 wherein said flexible thermal conductor is fabricated of thin corrugated copper sheet material and deflects under the action of said thermal actuator when said plate assembly is decoupled from said heat exchanger.

* * * * *